United States Patent [19]

Martinez

[11] 4,234,285
[45] Nov. 18, 1980

[54] ROOF TOP CARRIER

[76] Inventor: Evidio Martinez, 6875 Tamiami Canal Rd., Miami, Fla. 33126

[21] Appl. No.: 40,884

[22] Filed: May 21, 1979

[51] Int. Cl.³ .......................... B60P 3/10; B60R 9/08
[52] U.S. Cl. .................... 414/462; 224/310; 414/477
[58] Field of Search .............. 414/462, 477, 478, 479, 414/480; 224/310

[56] References Cited

U.S. PATENT DOCUMENTS

| 2,765,940 | 10/1956 | Nelson | 414/462 |
| 2,808,952 | 10/1957 | Nicholas | 414/462 |
| 2,889,950 | 6/1959 | Grimshaw | 414/462 |
| 3,193,124 | 7/1965 | Essling | 414/462 |
| 3,596,788 | 8/1971 | Willie | 414/462 |
| 3,927,799 | 12/1975 | Johnson | 414/462 |
| 4,024,971 | 5/1977 | Rohrer | 414/462 |
| 4,058,243 | 11/1977 | Tappan | 414/462 X |
| 4,139,236 | 2/1979 | Hill et al. | 414/477 X |

FOREIGN PATENT DOCUMENTS 971515  7/1975  Canada .................................. 414/480

Primary Examiner—L. J. Paperner

[57] ABSTRACT

An apparatus for carrying an article on the roof top of a motor conveyance and for conveniently loading and unloading the article. The apparatus including a main frame, a sliding frame slidably connected to the main frame, a carrier fixedly connected to the sliding frame and a hinge connected to the roof top for rotating engagement with the main frame. The main frame includes a pair of parallel side runs having front and rear ends and spanned by at least one cross member a predetermined distance from the rear ends. The sliding frames also includes a pair of parallel side runs. The sliding frame includes a rear end zone comprising a release/lock mechanism to prevent sliding movement. A front bracket is provided opposite the hinge on the conveyance roof top in line with the sliding frame to prevent rotational movement of the apparatus, thereby preventing premature unloading.

11 Claims, 5 Drawing Figures

ROOF TOP CARRIER

TECHNICAL FIELD

This apparatus relates to roof top carriers and, more particularly, to cableless rotatable and slidable roof top carriers.

BACKGROUND OF THE INVENTION

In the past there have been various roof top carriers. Among them have been Essling, U.S. Letters Pat. No. 3,193,124 which is a roof top carrier for boats. The Essling disclosure recognized and attempted to solve the problem of simplifying the prior art by providing a load carrying frame which was separable from the associated mounting frame. Additionally, other carriers such as Johnson, U.S. Letters Pat. No. 3,927,779 have attempted to solve the problem of unloading a vehicle from a roof top carrier, but like Johnson have proven to be very complex. Additionally, Rohrer U.S. Letters Pat. No. 4,024,971 like Johnson uses a cable which can often prove to be quite cumbersome in loading and unloading an article from a roof top carrier. There have been other roof top carriers such as Tappan U.S. Letters Pat. No. 4,058,243 and Grimshaw U.S. Letters Patent 2,889,950 which have provided cableless roof top carriers but have also failed to solve the problems set out by Essling of being a simple design.

Applicant has provided an improved roof top carrier of a relatively simple design wherein one user may load and unload the carrier relatively easily. Moreover, Applicant's structure, as will be described hereinafter, uses gravity in a manner not heretofore comtemplated to efficiently load and unload an article from a roof top carrier.

OBJECTS OF THE INVENTION

An object of this invention to provide a rotatable roof top carrier wherein a main frame and a sliding frame are slidably interconnected.

Another object of this invention is to provide an apparatus wherein premature loading and unloading is prevented.

Another object of this invention is to provide a roof top carrier wherein the user merely pulls down on the release/lock mechanism to unload the article from the roof top and then pulls back while the sliding frame is extended from the main frame and is pivotally rotated to the ground.

Another object of this invention is to provide a roof top carrier which includes a carrier fixedly connected to the sliding frame.

Another object of this invention is to provide a roof top carrier which effectively and efficiently utilizes the forces of gravity.

A general object of this invention is to provide a structure as has been previously described and as will be described hereinafter to accomplish the objects and general purposes of this invention.

In accordance with these and other objects which will become apparent hereinafter, the instant invention will now be described with reference to the accompanying drawings, in which:

DESCRIPTION OF THE PREFERRED EMBODIMENT

Figure 1:
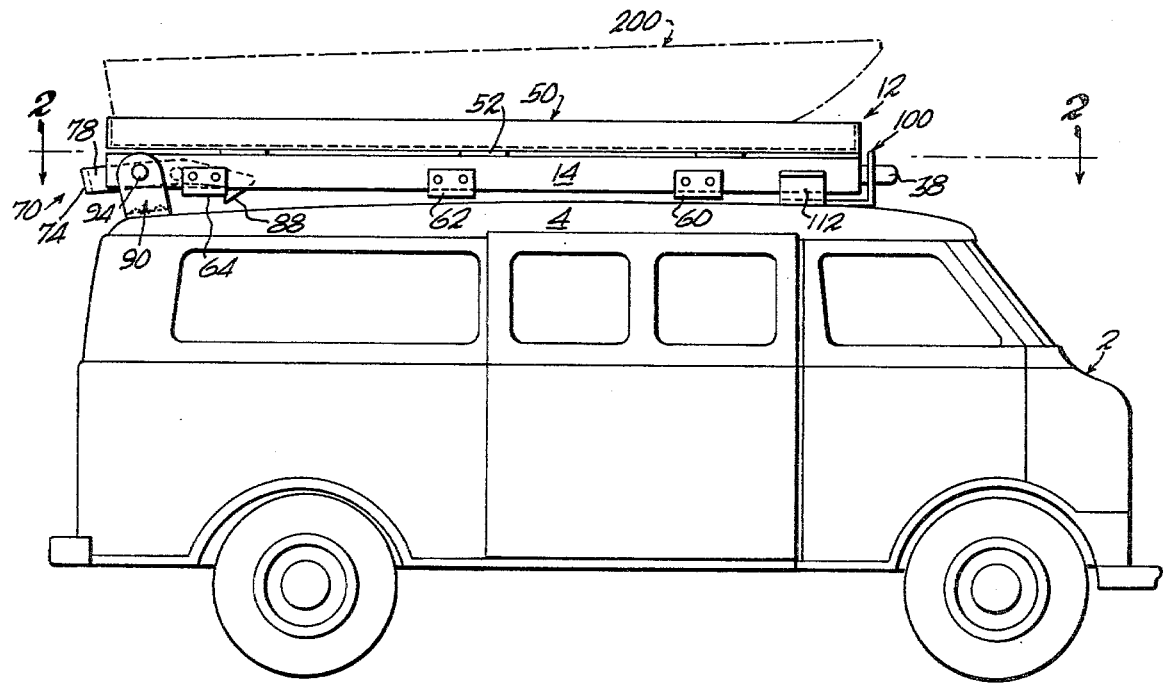
FIG. 1 is a side elevational view of the apparatus mounted in operative transport position while carrying a load.

Referring to the drawings wherein like reference characters designate like or corresponding parts throughout the several views and referring particularly to FIG. 1, there is shown the invention, a roof top carrier, generally designated by the numeral 12 in operative transport atop a motor conveyance 2 having a roof 4.

Figure 2:
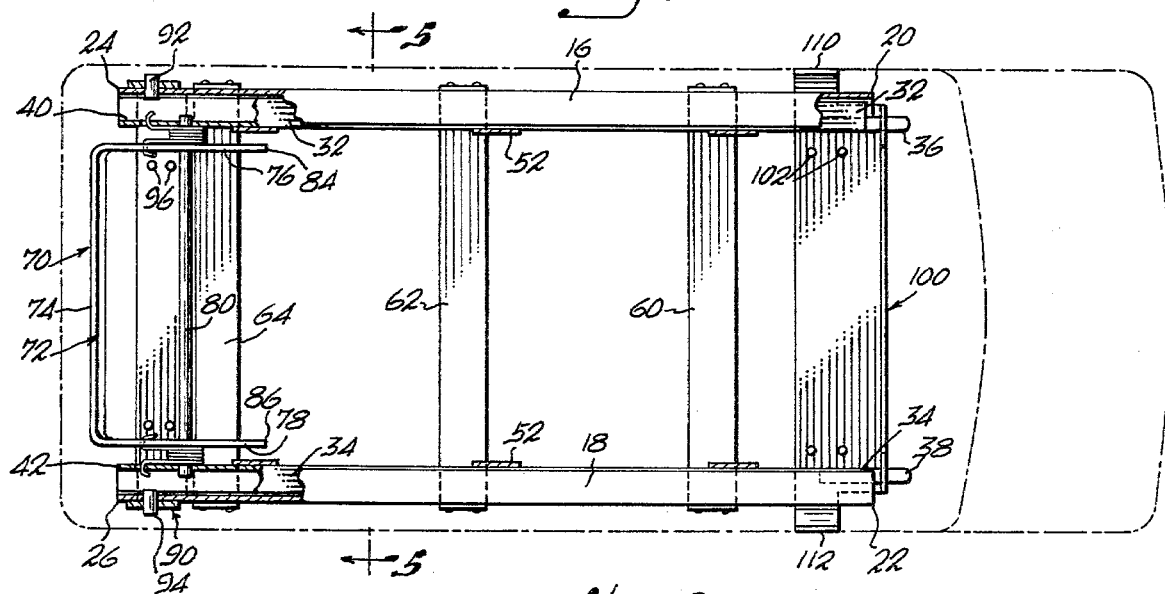
FIG. 2 is a top view of FIG. 1 taken along line 2—2.
Figure 5:
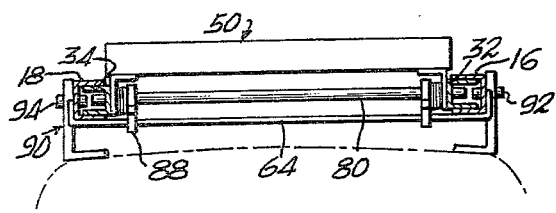
FIG. 5 is a sectional view of the hinge means and rear locking means shown mounted on the motor conveyance taken along 5—5 of FIG. 2.

The apparatus comprises a main frame generally designated by the numeral 14. The main frame as shown in FIG. 2 includes two runs 16 and 18. Each run has a first end 20 and 22 respectively, and a second end 24 and 26 respectively. As seen in FIG. 5, the runs 16 and 18 can be U-shaped members. However, as will be appreciated by one skilled in the art and as will be seen more readily hereinafter, other configurations are possible.

Figure 3:
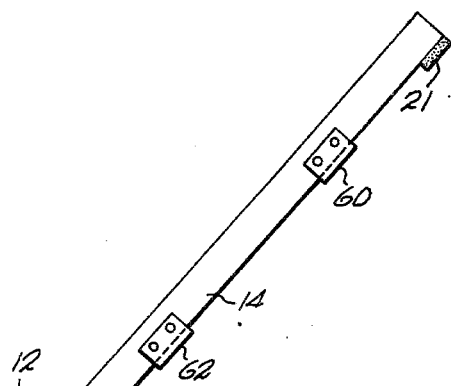
FIG. 3 is a side plan view illustrating one step in the operation of the apparatus.
Figure 3:
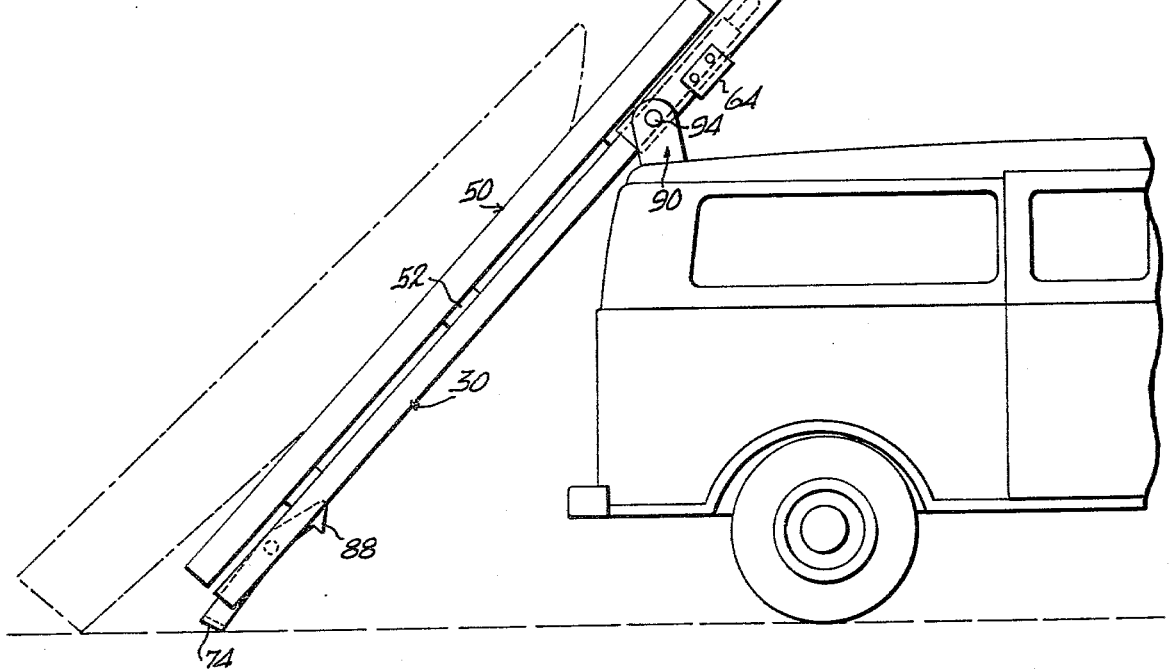

The apparatus includes a sliding frame generally designated 30 as seen in FIG. 3 including a pair of parallel runs 32 and 34 shown in FIG. 2. The sliding frame 30 includes a front end at each run designated by 36 and 38 comprising posts. The sliding frame also includes a rear end zone comprising the two rear ends of the sliding frame runs 40 and 42. As can be seen in FIG. 5, the sliding frame may be a U-shaped member which comprises an inside frame when the main frame 14 comprises an outside frame with the two U-shaped portions confronting one another. However, as will be readily appreciated by one skilled in the art, the U-shaped configuration is not necessary as long as one frame, the sliding frame, slides relative to the other frame, the main frame.

The sliding frame includes a carrier as shown in FIG. 1 and designated by the numeral 50. As can be seen in FIG. 5, the carrier is mounted atop the inside frame 30 along runs 32 and 34.

As seen in FIG. 2, the main frame may include a plurality of cross members and as will be readily apparent hereinafter, at least one is necessary to serve as a locking means to prevent sliding movement of the frames. The cross members are preferably mounted at the front such as 60 at the middle such as 62, and the rear such as 64. As will be readily appreciated, only one cross member is necessary to prevent sliding movement of the frames. Although cross member 64 is shown as the necessary cross member, it will be readily appreciated by those skilled in the art and as will be more fully apparent hereinafter either the middle or the front cross members 62 and 60 respectively could also serve as the cross member for preventing sliding engagement.

The rear ends of the sliding frame 30, 32 and 34 comprise a rear end zone as seen in FIGS. 2 and 5. The rear end zone includes a spring-loaded rear locking means to prevent sliding movement of the sliding frame and is generally designated by the numeral 70. The means includes a U-shaped member generally designated by the numeral 72 having a handle portion 74 and two legs 76 and 78 respectively. An axle 80 is provided which spans the legs and allows the U-shaped member to rotate with respect to the axle. Each leg terminates at a front end portion 84 and 86, each of which comprise a pawl as shown in FIG. 3 designated by the numeral 88. The pawl is sized and shaped to fit over a main frame cross member such as at 64 for locking and captivating engagement of the sliding frame with respect to the main frame as shown in FIG. 2. As will be readily appreciated, the front end portion of each leg could terminate over the middle cross member 62 or the front cross member 60, however, in its preferred embodiment the rear cross member has been chosen. The axle with the U-shaped member is rotatably connected to the rear end of the inside frame as shown in FIGS. 2 and 5 for rotatable interconnection therewith. A spring is mounted on the axle in the space between each sliding frame run and the leg such that the legs are normally urged in a downward position with the pawl over and captivatingly engaging the rear cross member to prevent sliding movement of the frames. The main frame is hingedly connected to the roof top by hinge means 90 which comprise two hinges 92 and 94 as shown in FIG. 2. The hinge means are fixedly mounted to the roof top at bolts 96. As shown in FIG. 2 the apparatus is hinged for rearward rotation to an inclined position as shown in FIG. 3. As will be appreciated by those skilled in the art the hinge could be attached to the front of the motor conveyance for hinged connection in a forward inclined position. However, in the preferred embodiment, the hinge means are shown at the rear of the motor conveyance for convenience of the user.

Figure 4:
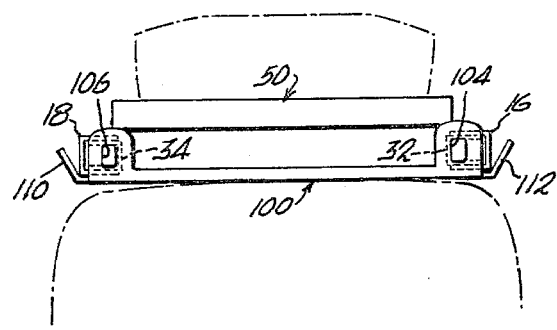
FIG. 4 is a frontal elevational view of the front locking bracket with the sliding frame in locked engagement.

As shown in FIGS. 2 and 4, a front bracket 100 is fixedly mounted on the roof top. As shown in FIG. 2, the bracket is mounted at the front of the motor conveyance, but as previously explained, the bracket could be mounted at the opposite end. The bracket is fixed by bolts 102 to the roof top of the motor conveyance. The purpose of the bracket is to prevent the apparatus from rotating and prematurely unloading the article. In the embodiment of the front bracket as shown in FIG. 4, the posts 36 and 38 of the sliding frame engage holes in the front bracket 104 and 106 to prevent rotational movement of the apparatus. The front end of the main frame 30 rests companionately within the front bracket as shown in FIGS. 2 and 4. As shown in FIG. 3, the front end of the main frame can include foot pads such as the one shown at 21 on the surface of the run which confronts the front bracket. This prevents abrasive contact between the confronting run and bracket surfaces. As will be readily appreciated by those skilled in the art, other foot pads could be provided along the confronting surface to further prevent abrasive contact between the roof top and the main bracket.

As can be seen in FIG. 2, the carrier portion 59 may include load support pads spaced appropriately along the inside of the carrier and generally designated by the numeral 52.

IN USE

As seen in FIG. 3, loading and unloading of the article 200 is done when the apparatus is in its extended and inclined position. At this point that the carrier is close to the point of loading and unloading thereby one person can easily maneuver the article for loading or unloading upon the carrier. The first step in the operation involves moving the carrier forward which in turn moves the sliding frame 30 toward the front bracket 100 thereby forcing gravitational forces to act upon the apparatus and generally urge the apparatus into a more horizontal position. As the article is further pushed forward, the sliding frame 30 engages the front bracket 100 in the horizontal position with the posts 36 and 38 of the horizontal bracket engaging the holes 104 and 106 of the front bracket. Simultaneously, the pawls 84 and 86 engage a cross member such as at 64 and captivate it through the normally downwardly spring urged legs 76, 78. In this way, an article can be easily loaded onto the carrier and pushed forward until placed in its locking horizontal position for operative transport.

To unload the article, the user merely pulls down on the handle portion 74 of the U-shaped member thus releasing pawls 84 and 86 which were in captivating engagement over a cross member such as 64. Thus, the user pushes the handle portion 74 in an opposite direction from its normally spring urged downward position. The user then pulls the handle such that the sliding frame 30 and its posts 36 and 38 are disengaged from the front bracket 100 thereby allowing the apparatus to rotate at hinge means 90 to its inclined position shown in FIG. 3. As the apparatus rotates to its inclined position, normal gravitational forces assist the user in achieving the inclined position shown in FIG. 3 and bringing the apparatus to its extended and inclined position. At that point, the article 200 may be unloaded from the carrier.

With particular reference to FIG. 4 there is shown the front locking bracket 100 having upwardly turned ends 110 and 112 which compatibly engage ends 20 and 22 of the main frame 30 and comprise a centering means. As seen in FIG. 4 regardless of whether external factors move the main frame an amount side to side, the upwardly turned ends 110 and 112 will have the tendency to force the main frame to a center position shown in FIG. 4.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An apparatus for carrying an article on the roof top of a motor conveyance and for conveniently loading and unloading the article, comprising:

a main frame including a pair of parallel side runs spaced a predetermined distance from each other, the runs including front and rear ends, the runs spanned by at least one cross member located a predetermined distance from the rear ends, and a hinge means fixedly connected to the top of the motor conveyance adjacent the rear ends, the main frame rotatably connected to the hinge means at the rear ends swingable to an inclined position away from its normal horizontal position, a sliding frame including a pair of parallel side runs spaced a predetermined distance from each other, sized and shaped for sliding movement with the main frame, each run having a front end comprising a post and a rear end comprising a rear sliding frame end zone, the rear end zone including spring-loaded means for locking the sliding frame against sliding movement relative to the main frame, a carrier means fixedly connected to the sliding frame, a front bracket fixedly mounted to the conveyance opposite the hinge means, sized and shaped for engagement with the sliding frame posts, comprising front locking means for preventing rotational movement of the apparatus, whereby the spring-loaded lock may be released and the sliding frame moved relative to the main frame and away from the front bracket, thereby the apparatus may be swung about the hinge and the sliding frame may slide relative to the main frame to an inclined and extended position such that the rear end zone is proximate and adjacent a loading and unloading point.

2. The device as set forth in claim 1 wherein the spring-loaded means comprises a U-shaped member having a handle portion and two legs spanned by an axle rotatably attached to each leg, each leg terminating at a front end and the front end defining a pawl, sized and shaped for captivating and mating engagement over a main frame cross member, the means rotatably connected to the rear end zone of the sliding frame at the runs thereby spanning the sliding frame at the rear end, and a pair of springs mounted on the axle one each in the position between the runs and the legs, the spring normally urging the handle member in a downward position such that the pawl is urged downward, thereby when the sliding frame posts are in engagement with the front bracket, the pawl is positioned over a main frame cross member preventing sliding movement of the sliding frame.

3. The apparatus as set forth in claim 1 or claim 2 wherein the main frame includes three cross members, one at the front, one at the rear and one spaced approximately equidistance between the other two.

4. The device as set forth in claim 3 wherein the carrier is spaced a predetermined distance above the sliding frame.

5. The device as set forth in claim 4 wherein the main frame is an outside frame and the sliding frame comprises an inside frame, both frames are U-shaped with their U portions opposite one another, the inside frame fitting capatibly within the outside frame for sliding movement thereto.

6. The device as set forth in claim 1 wherein the motor conveyance has a roof top with a front end and a rear end with the front bracket located at the front end and the hinge means located at the opposite end.

7. The apparatus as set forth in claim 1 wherein the motor conveyance has a roof top including a front end and a rear end and wherein the front bracket is at the rear end and the rear bracket is at the front end of the roof top.

8. The apparatus as set forth in claim 1 wherein the runs include a bottom surface confronting the roof top of the conveyance and wherein the bottom end of each run located at the front end includes a foot pad portion for nonabrasive engagement of the main frame with the roof top and bracket.

9. The device as set forth in claim 4 wherein the carrier includes inside surfaces having support pads spaced a predetermined distance from each other.

10. The device as set forth in claim 2 wherein the device includes a centering means.

11. The device as set forth in claim 10 wherein the front bracket includes upwardly turned ends comprising a centering means.

* * * * *